(12) United States Patent
Zhang

(10) Patent No.: US 12,445,712 B2
(45) Date of Patent: Oct. 14, 2025

(54) PROP PROCESSING METHOD AND APPARATUS, AND DEVICE AND MEDIUM

(71) Applicant: Beijing Zitiao Network Technology Co., Ltd., Beijing (CN)

(72) Inventor: Shupeng Zhang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/399,331

(22) Filed: Dec. 28, 2023

(65) Prior Publication Data

US 2024/0147050 A1     May 2, 2024

Related U.S. Application Data

(63) Continuation of application No. PCT/CN2022/119536, filed on Sep. 19, 2022.

(30) Foreign Application Priority Data

Sep. 28, 2021    (CN) ........................ 202111145397.X

(51) Int. Cl.
| | |
|---|---|
| H04N 23/62 | (2023.01) |
| G06F 3/0482 | (2013.01) |
| G06F 3/04845 | (2022.01) |
| H04N 5/262 | (2006.01) |
| H04N 23/63 | (2023.01) |

(52) U.S. Cl.
CPC ........... *H04N 23/62* (2023.01); *G06F 3/0482* (2013.01); *G06F 3/04845* (2013.01); *H04N 5/2621* (2013.01); *H04N 23/631* (2023.01)

(58) Field of Classification Search
CPC .... G06F 3/0484; G06F 3/0481; G06F 3/0482; G06F 3/04845; H04N 23/632; H04N 23/62; H04N 23/631; H04N 5/262
See application file for complete search history.

(56) References Cited

U.S. PATENT DOCUMENTS

| | | | |
|---|---|---|---|
| 8,244,103 B1 * | 8/2012 | Shore | H04N 5/775 |
| | | | 386/285 |
| 11,081,140 B1 * | 8/2021 | Cheng | G11B 27/031 |

(Continued)

FOREIGN PATENT DOCUMENTS

| | | |
|---|---|---|
| CN | 106779933 A | 5/2017 |
| CN | 108052670 A | 5/2018 |

(Continued)

OTHER PUBLICATIONS

International Search Report and Written Opinion dated Dec. 1, 2022 in PCT/CN2022/119536, English translation (13 pages).

(Continued)

*Primary Examiner* — William L Bashore
*Assistant Examiner* — Gregory A DiStefano

(57) ABSTRACT

The present disclosure relates to a prop processing method and apparatus, and a device and a medium. The method comprises: in response to a trigger operation for a prop exploration entrance identifier, which is set on a prop panel, displaying a prop exploration page, wherein the prop exploration page comprises a prop recommendation identifier; and in response to a trigger operation for the prop recommendation identifier, displaying a recommended video set of prop use.

8 Claims, 9 Drawing Sheets

(56) References Cited

U.S. PATENT DOCUMENTS

| | | | |
|---|---|---|---|
| 2009/0006368 A1* | 1/2009 | Mei | H04N 21/4667 |
| | | | 707/999.005 |
| 2016/0196052 A1 | 7/2016 | Franklin et al. | |
| 2017/0018289 A1 | 1/2017 | Morgenstern | |
| 2017/0025153 A1* | 1/2017 | Svendsen | H04N 21/854 |
| 2017/0182416 A1 | 6/2017 | Lee et al. | |
| 2017/0236551 A1* | 8/2017 | Leiberman | G11B 27/28 |
| | | | 386/285 |
| 2017/0243611 A1 | 8/2017 | Buyuklu et al. | |
| 2018/0152767 A1 | 5/2018 | Liu et al. | |
| 2020/0257414 A1 | 8/2020 | Wang | |
| 2021/0297743 A1 | 9/2021 | Miao | |
| 2021/0375320 A1* | 12/2021 | Wong | H04N 21/4223 |
| 2022/0208230 A1* | 6/2022 | Spreitzer | G11B 27/034 |
| 2022/0335697 A1* | 10/2022 | Harding | G06T 15/00 |
| 2022/0382440 A1* | 12/2022 | Manzari | H04N 23/631 |
| 2022/0394191 A1 | 12/2022 | Wang et al. | |
| 2023/0086518 A1* | 3/2023 | Marissen | G10H 1/0008 |
| | | | 705/26.7 |
| 2023/0260548 A1* | 8/2023 | Ponochevnyi | G11B 27/28 |
| | | | 386/285 |

FOREIGN PATENT DOCUMENTS

| | | |
|---|---|---|
| CN | 108984081 A | 12/2018 |
| CN | 110688525 A | 1/2020 |
| CN | 106294831 B | 2/2020 |
| CN | 110913135 A | 3/2020 |
| CN | 111163274 A | 5/2020 |
| CN | 306182373 A | 11/2020 |
| CN | 112015926 A | 12/2020 |
| CN | 112069358 A | 12/2020 |
| CN | 112135059 A | 12/2020 |
| CN | 112449231 A | 3/2021 |
| CN | 112569596 A | 3/2021 |
| CN | 112989076 A | 6/2021 |
| CN | 113778285 A | 12/2021 |
| JP | 2008022506 A | 1/2008 |
| JP | 2019-009754 A | 1/2019 |
| KR | 10-1571687 B1 | 11/2015 |
| KR | 2018-0041879 A | 4/2018 |
| KR | 2020-0080287 A | 7/2020 |
| WO | 2017005014 A1 | 1/2017 |
| WO | 2019/126723 A1 | 6/2019 |

OTHER PUBLICATIONS

European Search Report for EP Patent Application No. 22874681.4, Issued on Sep. 30, 2024, 32 pages.

Office action received from Japanese patent application No. 2023-579498 mailed on Oct. 29, 2024, 8 pages (4 pages English Translation and 4 pages Original Copy).

Communication Pursuant to Rules 70(2) and 70a(2) EPC for European Application No. 22874681.4, mailed Oct. 17, 2024, 1 page.

* cited by examiner

PROP PROCESSING METHOD AND APPARATUS, AND DEVICE AND MEDIUM

The present disclosure claims priority to the PCT application No. PCT/CN2022/119536 filed on Sep. 19, 2022 and the Chinese Patent Application No. "202111145397.X" filed on Sep. 28, 2021 and entitled "PROP PROCESSING METHOD AND APPARATUS, AND DEVICE AND MEDIUM". The disclosure of each of these applications is incorporated herein by reference.

TECHNICAL FIELD

The present disclosure relates to the technical field of computer application, and in particular to a prop processing method and apparatus, a device and a medium.

BACKGROUND

With the advancement of computer application technology, it has become common to render props when shooting photos or videos to increase the interest of the photos or videos.

In related art, based on the prop panel, different prop controls are displayed to the user, who triggers the prop controls of interest according to his/her own preferences and loads corresponding prop resources to shoot and view the effect of the props. Therefore, the user needs to repeatedly load the test for several times to determine the props they want to use, which consumes a lot of time and resources and reduces processing efficiency.

SUMMARY

Embodiments of the present disclosure provide a prop processing method, including: in response to a trigger operation on a prop exploration entry identifier set on a prop panel, displaying a prop exploration page that includes a prop recommendation identifier; and in response to a trigger operation on the prop recommendation identifier, displaying a recommended video set for use of prop.

Embodiments of the present disclosure provide a prop processing method, including: receiving a prop recommendation request sent by a client; determining a plurality of prop usage videos which video popularity meets a preset first screening condition; and sending the plurality of prop usage videos to the client, and displaying a recommended video set for use of prop.

Embodiments of the present disclosure further provide a prop processing apparatus, including: a display module, which is configured to display, in response to a trigger operation on a prop exploration entry identifier set on a prop panel, a prop exploration page that includes a prop recommendation identifier; and a first display module, which is configured to display, in response to a trigger operation on the prop recommendation identifier, a recommended video set for use of prop.

Embodiments of the present disclosure further provide a prop processing apparatus, including: a receiving module, which is configured to receive a prop recommendation request sent by a client; a determination module, which is configured to determine a plurality of prop usage videos which video popularity meets a preset first screening condition; and a second display module, which is configured to send the plurality of prop usage videos to the client, and display the recommended video set for use of prop.

Embodiments of the present disclosure further provide an electronic device, including: a processor; and a memory for storing instructions executable by the processor, where the processor is configured to read the executable instructions from the memory, and execute the executable instructions to implement the prop processing method provided in the embodiments of the present disclosure.

Embodiments of the present disclosure further provide a computer-readable storage medium storing a computer program, where the computer program is used to execute the prop processing method provided in the embodiments of the present disclosure.

BRIEF DESCRIPTION OF THE DRAWINGS

The above and other features, advantages and aspects of various embodiments of the present disclosure will become more apparent with reference to the following detailed description taken in conjunction with the accompanying drawings. Throughout the accompanying drawings, the same or similar reference numbers refer to the same or similar elements. It should be understood that the accompanying drawings are schematic and that components and elements are not necessarily drawn to scale.

DETAILED DESCRIPTION

Figure 1:
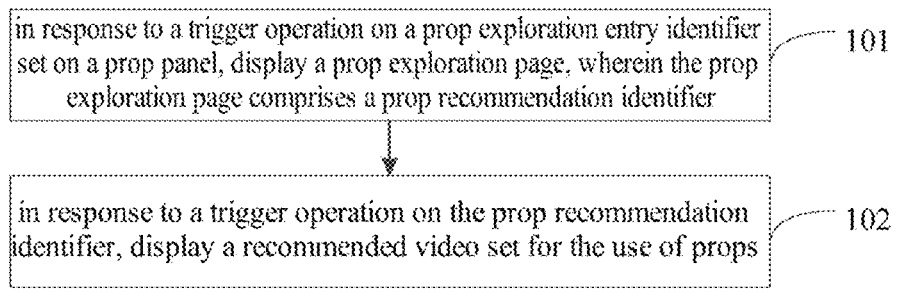
FIG. 1 is a schematic flowchart of a prop processing method provided in an embodiment of the present disclosure.

Embodiments of the present disclosure will be described below with reference to the accompanying drawings.

Although some embodiments of the present disclosure are shown in the accompanying drawings, it should be understood that the present disclosure may be embodied in various forms and should not be construed as limited to the embodiments set forth herein, but these embodiments are rather provided for a more thorough and complete understanding of the present disclosure. It should be understood that the accompanying drawings and embodiments of the present disclosure are for illustrative purposes only and are not intended to limit the scope of protection of the present disclosure.

It should be understood that various steps described in the method implementations of the present disclosure may be executed in different orders and/or in parallel. In addition, method implementations may include additional steps and/or omit performance of illustrated steps. The scope of the present disclosure is not limited in this regard.

The term "include" and its variations used herein are open-ended, i.e., "including but not limited to". The term "based on" means "based at least in part on". The term "one embodiment" means "at least one embodiment"; the term "another embodiment" means "at least one additional embodiment"; and the term "some embodiments" means "at least some embodiments". Relevant definitions of other terms will be given in the description below.

It should be noted that concepts such as "first" and "second" mentioned in the present disclosure are only used to distinguish different apparatuses, modules or units, and are not used to limit the order or interdependence of functions performed by these apparatuses, modules or units.

It should be noted that the modifications of "one" and "a plurality of" mentioned in the present disclosure are illustrative and not restrictive. Those skilled in the art should understand that unless the context clearly indicates otherwise, it should be understood as "one or a plurality of".

Names of messages or information exchanged between a plurality of apparatuses in the implementations of the present disclosure are for illustrative purposes only and are not used to limit the scope of these messages or information.

In order to solve the above technical problems or at least partially solve the above technical problems, the present disclosure provides a prop processing method and apparatus, a device and a medium. The recommended props are enriched, and props are intuitively recommended based on the form of recommended videos, which improves the efficiency of selecting props and improves the fun of using props.

In order to solve the above problems, in the embodiments of the present disclosure, recommended videos related to props are also displayed based on a trigger operation on a prop search entry, so that the intuitiveness of recommending props is further improved based on the recommended videos, and the user can intuitively learn the effect of the props based on the recommended videos, which improves the efficiency of selecting props and helps improve the success rate of recommending props.

Compared with the prior art, the technical solutions provided in the embodiments of the present disclosure have the following advantages.

According to the prop processing solutions provided in the embodiments of the present disclosure, in response to a trigger operation on a prop exploration entry identifier, a prop exploration page that includes a prop recommendation identifier is displayed, and then in response to a trigger operation on the prop recommendation identifier, a recommended video set for use of prop is displayed. In this way, the recommended props are enriched, and props are intuitively recommended based on the form of recommended videos, which improves the efficiency of selecting props and improves the fun of using props.

The props mentioned in the embodiments of the present disclosure can be makeup animation special effects, face stickers and other data resources that enhance the interest of photos or videos.

In order to more comprehensively describe the prop recommendation modes provided in the embodiments of the present disclosure, the description of corresponding prop processing methods will be explained focusing on a client side and a server side, respectively.

First, the prop processing method is explained focusing on the client side.

FIG. 1 is a flowchart of a prop processing method provided in an embodiment of the present disclosure. As shown in FIG. 1, the method includes:

Step 101, in response to a trigger operation on a prop exploration entry identifier set on a prop panel, display a prop exploration page that includes a prop recommendation identifier.

Prop recommendation in this embodiment can be used in photo shooting scenarios, and can also be used in video processing scenarios. The video processing scenarios can include any videos that have been already shot, and can also include live videos that are being shot, etc., which will not be limited here.

In this embodiment, the prop exploration entry identifier is displayed on the prop panel. For example, after the camera takes a photo, the prop exploration entry identifier is displayed on the prop panel on a photo shooting interface. For another example, the prop exploration entry identifier is displayed on the prop panel on a shooting interface in a video application.

The prop exploration entry identifier in the embodiment of the present disclosure may be one or more in a text form, a picture form, a string form, an animation form, etc.

Figure 2:
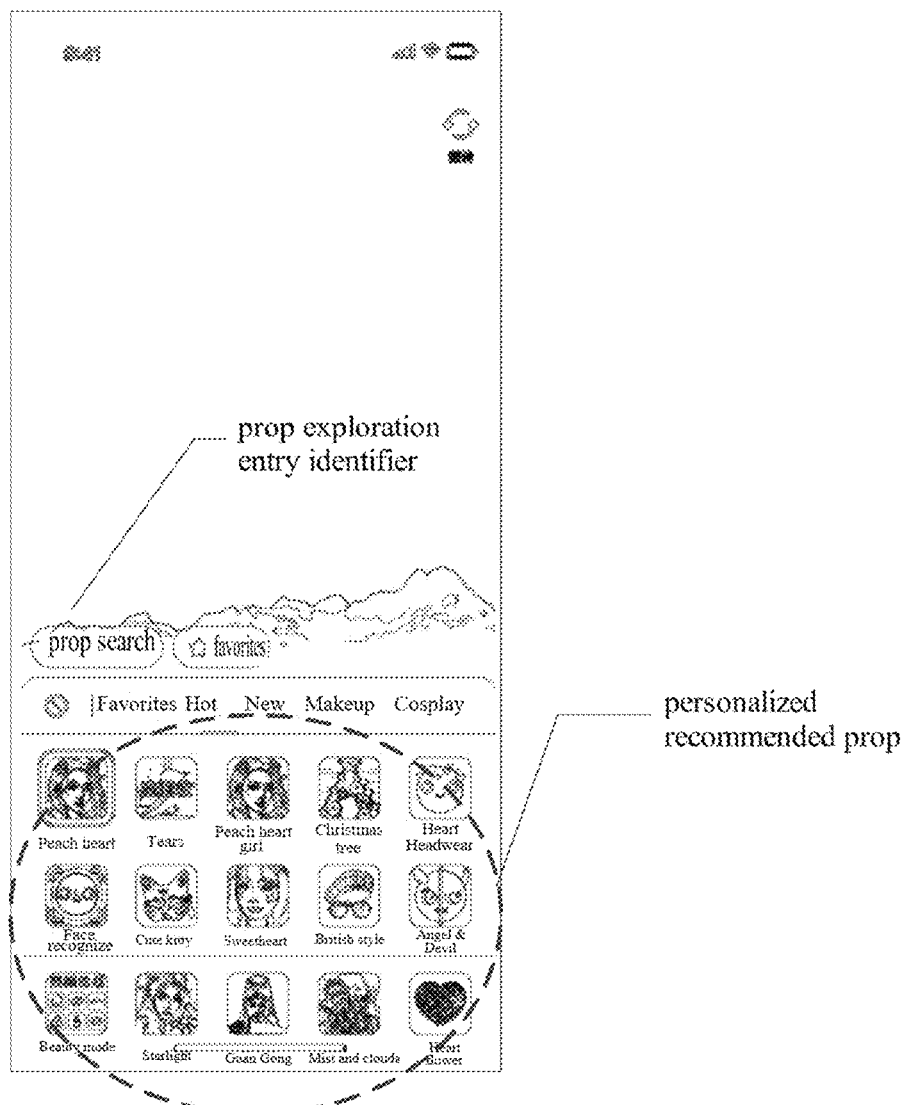
FIG. 2 is a schematic interface diagram of a prop exploration entry identifier provided in an embodiment of the present disclosure.

In one embodiment of the present disclosure, as shown in FIG. 2, the prop exploration entry identifier is displayed on the control panel of the application homepage in the video application, and the text "search" can be displayed on the homepage as the corresponding prop exploration entry identifier.

In some embodiments, in order to improve the efficiency of recommending props, corresponding personalized recommended props can also be generated, according to the user's personal portrait information or historical preferences, on the page that displays the prop exploration entry identifier on the control panel, and prop identifiers of the personalized recommended props are displayed on the control panel, so as to facilitate the user to quickly select the needed props when needed. For example, as shown in FIG. 2, text and icons are displayed on the control panel in the video application as the prop identifiers of the personalized recommended props, which facilitates the user to directly use corresponding props when needed.

In this embodiment, in response to a trigger operation on the prop exploration entry identifier on the control panel, such as a click operation or a long press operation, the prop search page is displayed, where the prop search page is used to provide the user with search entries for all props. In this way, the user can search for needed props based on the prop search page.

In this embodiment, in order to further improve the efficiency of searching for props, the prop search page may also include a prop recommendation identifier, where the prop recommendation identifier may be a combination of one or more in a text form, a video form, a picture form, an animation form, etc.

Step 102, in response to a trigger operation on the prop recommendation identifier, display a recommended video set for use of prop.

Figure 3:
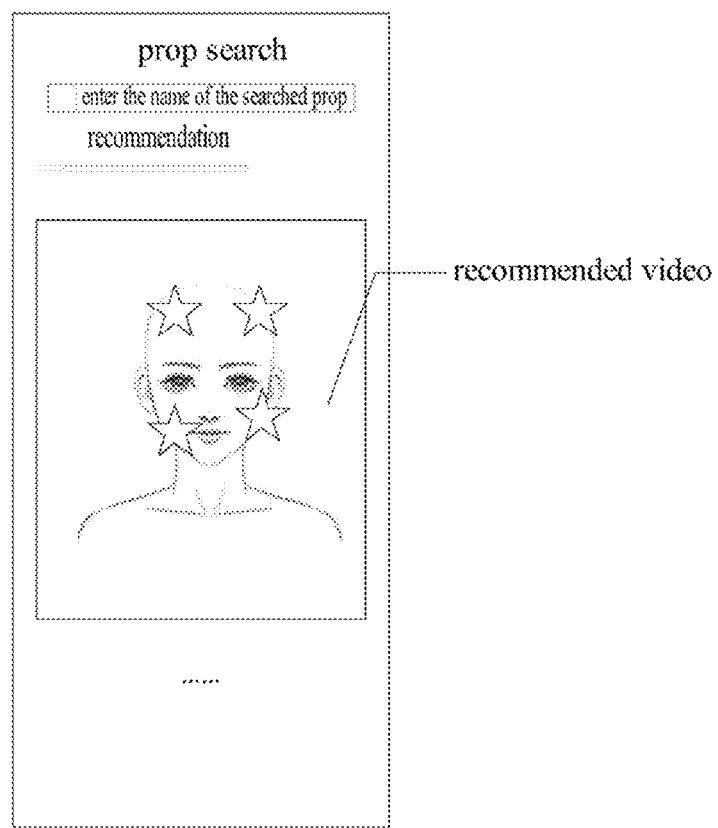
FIG. 3 is a schematic interface diagram of a recommended video for props provided in an embodiment of the present disclosure.

In this embodiment, if a trigger operation on the prop recommendation identifier is detected, such as a click operation or a long press operation, it indicates that the user may wish to acquire recommendations based on props across the entire network. Therefore, a recommended video set for use of prop is displayed, where the recommended video set for props includes a plurality of recommended videos for recommended props, and the recommended videos may be recommended videos for props, for example, an introduction video for props, or a usage video for props, and for example, a video for the effects of a user using corresponding recommended props, etc. As shown in FIG. 3, when a recommended prop is to add "stars" to a person's face, the videos of adding "stars" that are used by other users are taken as recommended videos. In this way, intuitively displaying the gameplay and effects of recommended props to the user based on the recommended videos in the recommended video set improves the user's satisfaction and success rate in selecting recommended props.

The recommended props corresponding to the recommended video set for props can be recommended props taken by screening the props that have been used more frequently according to the number of uses based on the current number of times all props on the entire network are used; can also be recommended props taken by acquiring the current region of the client, searching for the number of times all props on the entire network are used in the region, and screening the props that have been used more frequently according to the number of uses; can also be recommended props taken by acquiring address book information of the user corresponding to the client, and based on the address book information, matching the props in the address book that have been used by other users; or can also be recommended props taken by acquiring information type (such as a character type or a landscape type) of multimedia information (such as photos or videos) of props to be added that the user currently shoots, querying a preset database based on the information type of the multimedia information to acquire corresponding candidate recommended props, and according to the number of times the candidate recommended props are used, screening the props that have been used more frequently as recommended props.

Figure 4:
FIG. 4 is a schematic scene diagram of a recommended video for props provided in an embodiment of the present disclosure.

In actual implementations, when the recommended video set includes a plurality of recommended videos, the plurality of recommended videos can be switched and displayed in the form of cards from top to bottom as shown in FIG. 4 due to the limitation of the size of the client screen, and the user sliding from bottom to top can switch the display of the recommended videos. Certainly, the plurality of recommended videos can also be switched and displayed from left to right, in the form of animation cut, etc., which are not listed here.

In one embodiment of the present disclosure, in order to further improve the efficiency of using recommended props, shooting controls can also be set for each video in the recommended video set, where the shooting controls can include one or more of text, icons, etc. For example, as shown in FIG. 5, corresponding shooting controls are displayed below the recommended videos.

In this embodiment, in response to a trigger operation on the shooting control of a first video in the recommended video set, a shooting page is switched to, for example, a photo shooting page or a video shooting page, etc., is switched to; and a resource package of a target prop used in the first video is acquired, the resource package is parsed to acquire a target prop configuration template, and shooting content is rendered according to the target prop configuration template to generate a second video, where the resource package of the target prop can be various data resources that generate the target prop, such as animation rendering parameters, rendering positions and rendering textures corresponding to the target prop, and a configuration template of the target prop can be generated based on the resource package, so as to add the target prop at the corresponding position to generate the second video. An identification function, etc. of the corresponding position can also be obtained based on the analysis of the data resources.

Figure 5:
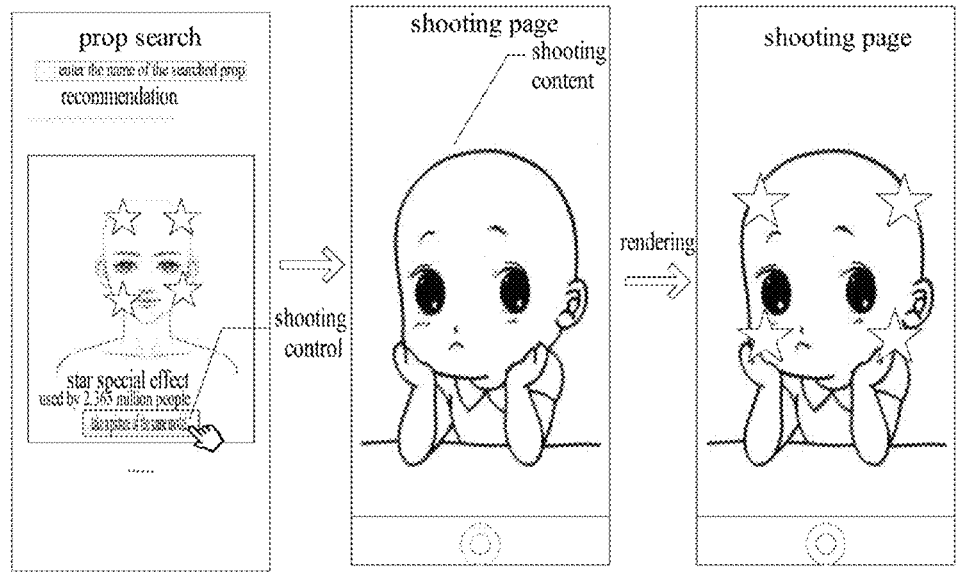
FIG. 5 is a schematic diagram of an application scene of a recommended prop provided in an embodiment of the present disclosure.

For example, continuing as shown in FIG. 5, when the application scene of the recommended props is a video shooting scene, in response to the trigger operation on the shooting control of the first video in the recommended video set, the shooting page is switched to; if the target prop corresponding to the shooting control of the first video is to add a star special effect to the user's face, a resource package of the star special effect is then acquired; and after a template of the corresponding star special effect is parsed and obtained, if the shooting content is a face, corresponding stars are rendered on a face image to generate a corresponding second video.

In summary, according to the prop processing method provided in the embodiment of the present disclosure, in response to a trigger operation on a prop exploration entry identifier, a prop exploration page that includes a prop recommendation identifier is displayed, and then in response to a trigger operation on the prop recommendation identifier, a recommended video set for use of prop is displayed. In this way, the recommended props are enriched, and props are intuitively recommended based on the form of recommended videos, which improves the efficiency of selecting props and improves the fun of using props.

In order to further enrich the prop recommendation modes, props can also be recommended based on the popularity in the form of a list in the present disclosure, thereby recommending props that are more popular among other users on the entire network to the user.

Figure 6:
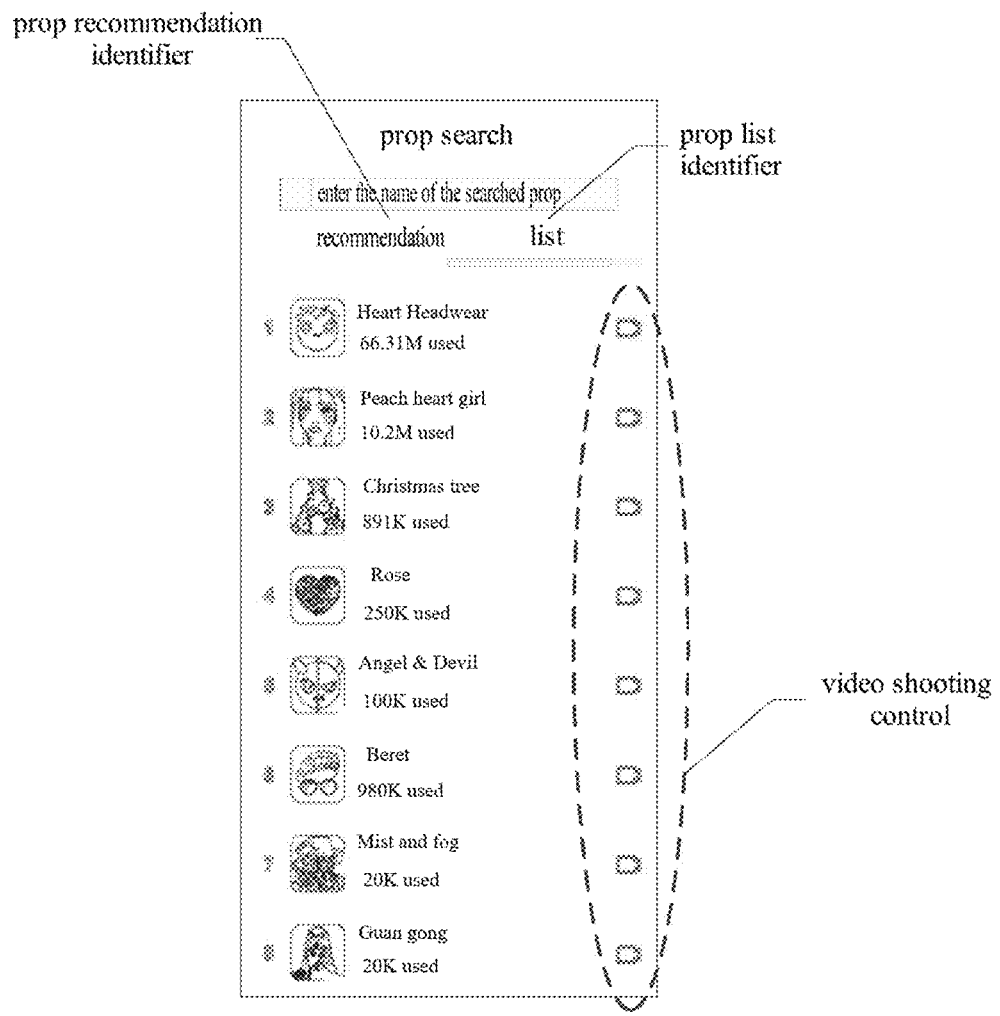
FIG. 6 is a schematic page diagram of a prop search page provided in an embodiment of the present disclosure.

In one embodiment of the present disclosure, a prop list identifier can also be provided on the prop search page. The prop list identifier can be in a text form, a picture form, an animation form, etc. The prop list identifier and the prop recommendation identifier can be displayed in the same row, can also be displayed in different rows, etc., can be displayed in a floating manner, or can be displayed as a menu. As shown in FIG. 6, the prop list identifier and the prop recommendation identifier can be displayed side by side below the prop search entry on the prop search page, so that when the user has no specific intention to search for props and has no intention to search for prop input at the prop search entry, recommended props can be acquired based on a trigger operation on the prop recommendation identifier or the prop list identifier, so as to facilitate the selection of props from among the recommended props.

It should be noted that in different application scenes, corresponding prop popularity ranking lists are displayed in different ways. Examples are as follows.

In some embodiments, continuing to refer to FIG. 6, when the prop list identifier is triggered, a corresponding prop popularity ranking list can be displayed, and prop information such as prop icons, prop names and usage popularity values of the props can be displayed in the prop popularity ranking list in the ascending order of the props.

Figure 7:
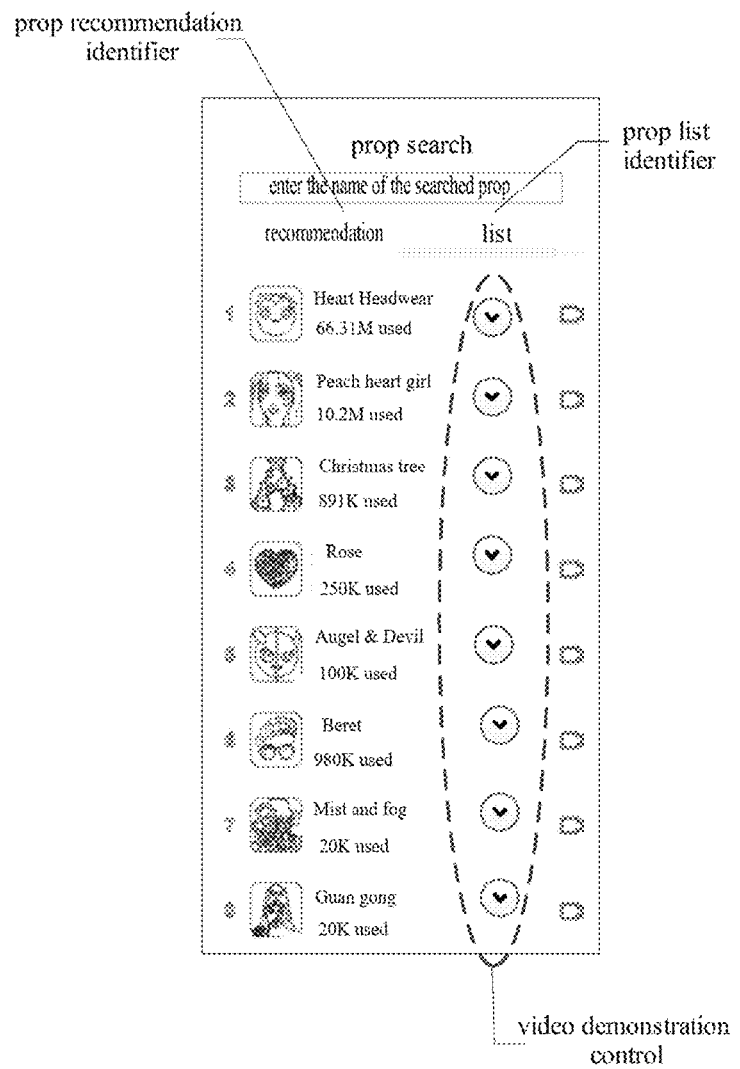
FIG. 7 is a schematic diagram of a prop popularity ranking list provided in an embodiment of the present disclosure.

In other embodiments, as shown in FIG. 7, a video demonstration control is correspondingly provided for each piece of prop information in the prop popularity ranking list, so that in response to a trigger operation on the video demonstration control of the target prop in the prop popularity ranking list, a demonstration video using the target prop is displayed, thereby improving the intuitiveness of prop recommendations in the list.

In the embodiment of the present disclosure, in order to improve the efficiency of application conversion of props, referring to FIGS. 6 and 7, a shooting control is correspondingly provided for each piece of prop information in the prop popularity ranking list, so that in response to a trigger operation on the shooting control of the target prop in the prop popularity ranking list, the shooting page is switched to, for example, a photo shooting page or a video recording page, etc. are switched to; further, a resource package corresponding to the target prop is acquired, the resource package is parsed to acquire a target prop configuration template, and the shooting content is rendered according to the target prop configuration template to generate a target video. The mode of rendering shooting content based on a prop configuration template to generate a target video may refer to the above embodiment, and will not be described again here.

Figure 8:
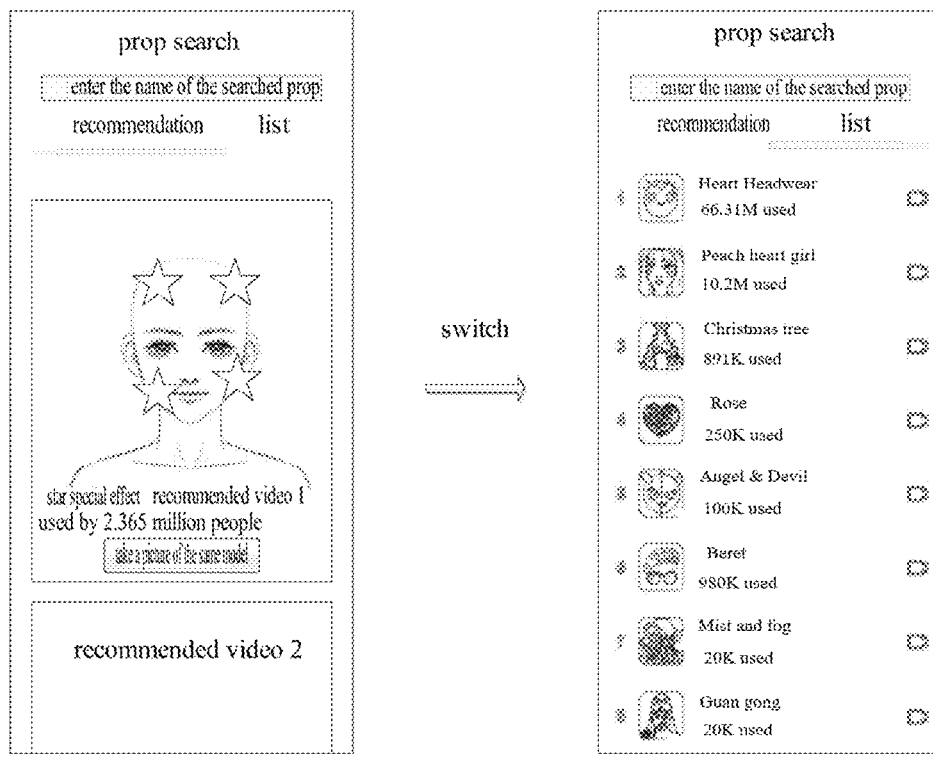
FIG. 8 is a schematic diagram of an application scene of another recommended prop provided in an embodiment of the present disclosure.

During actual execution, the prop list identifier and the prop recommendation identifier can be triggered by switching. In this embodiment, as shown in FIG. 8, in response to the switching operation on the prop list identifier or the prop recommendation identifier, the prop popularity ranking list or the recommended video set for use of prop can be displayed in a preset target area, where the target area can be any blank area on the screen, and the target area can be pre-calibrated, that is, in this embodiment, the recommended video set for use of prop and the prop popularity ranking list are both displayed in the preset target area, with only one of the two being displayed. In this way, the props recommended based on the prop list identifier or the prop recommendation identifier are displayed separately, thereby ensuring the clarity of display.

In another embodiment of the present disclosure, in response to a trigger operation on the prop list identifier and the prop recommendation identifier, the prop popularity ranking list can also be displayed in a preset first area, and the recommended video set for use of prop can also be displayed in a preset second area, where the second area is different from the first area. The first area and the second area can be distributed left and right, up and down, etc., which will not be limited here. The first area and the second area can dynamically adjust the size of the display areas, etc. according to the amount of content to be displayed.

In some embodiments, if in response to the trigger operation on the prop list identifier and the prop recommendation identifier, the prop popularity ranking list is displayed in the preset first area, and the recommended video set for use of prop is displayed in the preset second area, the method further includes: in response to a trigger operation on the first area, such as a sliding operation or a click operation, updating the prop popularity ranking list that is displayed in the first area, or in response to a trigger operation on the second area, such as a sliding operation or a click operation, updating the recommended video set for use of prop that is displayed in the second area.

Figure 9:
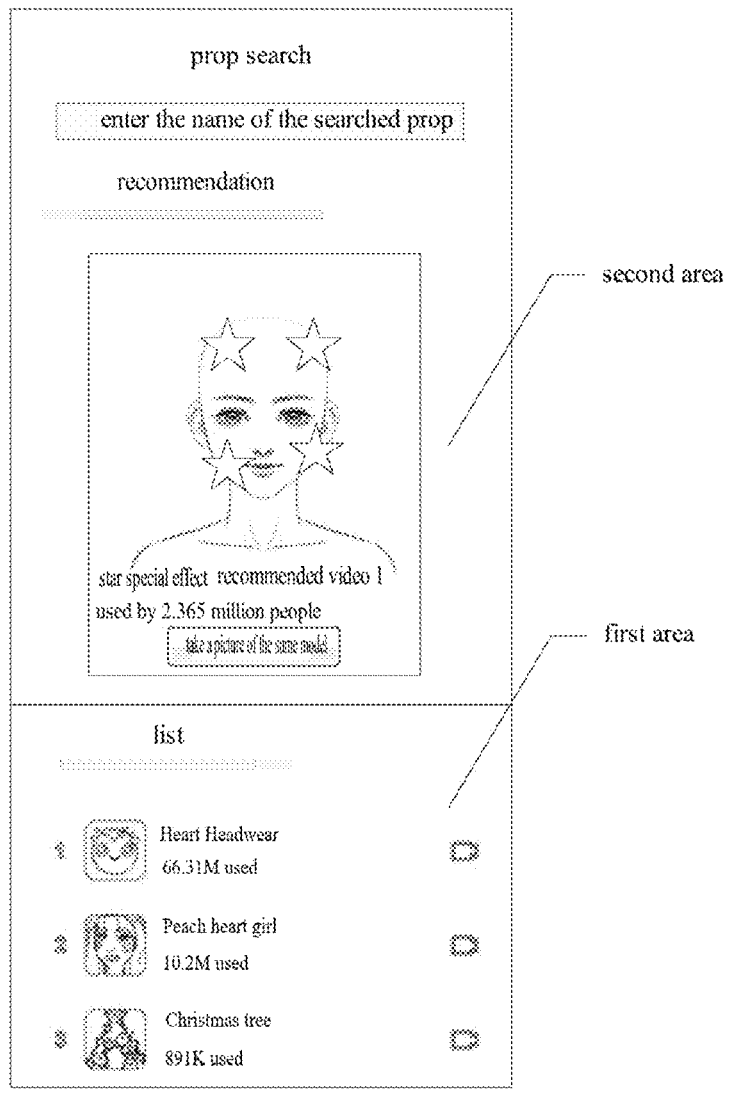
FIG. 9 is a schematic page diagram of another prop search page provided in an embodiment of the present disclosure.

In this embodiment, referring to FIG. 9, when the first area and the second area are displayed up and down, the prop popularity ranking list can be displayed in the first area on the client screen, and the recommended video set for use of prop can be displayed in the preset second area, thereby further enhancing the richness of each recommended prop. The first area and the second area can be split-screened to respond to the client's trigger operations to update relevant content. For example, when the user slides the ranking list in the first area, the prop information, etc. in the ranking list will be switched to display; and when the user slides the second area, the switching of recommended videos will be realized.

In summary, according to the prop processing method provided in the embodiment of the present disclosure, props can also be recommended based on displaying prop popularity ranking lists and based on the popularity of the props used by all users, which improves the success rate of recommendations on the basis of the enrichment of the recommended props.

The prop processing method provided in the embodiment of the present disclosure will be described below focusing on the server side.

Figure 10:
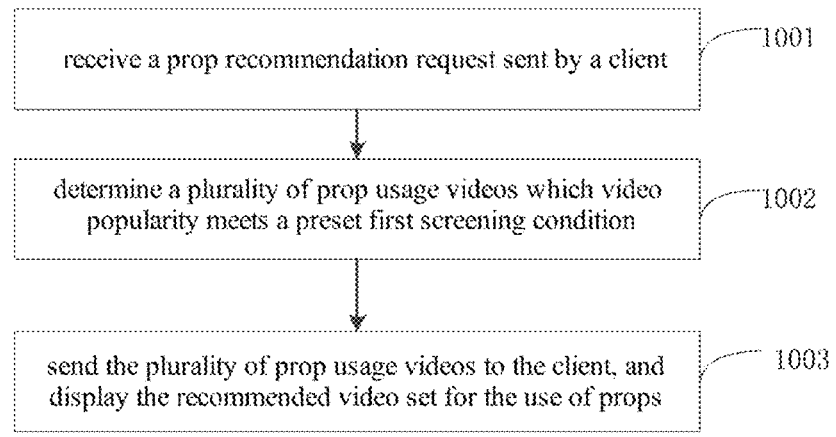
FIG. 10 is a schematic flowchart of another prop processing method provided in an embodiment of the present disclosure.

FIG. 10 is a flowchart of a prop processing method according to an embodiment of the present disclosure. As shown in FIG. 10, the method includes:

Step 1001, receive a prop recommendation request sent by a client.

In this embodiment, if it is detected that the prop recommendation identifier of the client is triggered, a corresponding prop recommendation request is acquired, and the prop recommendation request is then sent to the client.

Step 1002, determine a plurality of prop usage videos which video popularity meets a preset first screening condition.

In this embodiment, in response to the prop recommendation request sent to the client, videos recommended for the user are screened.

In this embodiment, in order to improve the success rate of recommended props, a plurality of prop usage videos which video popularity meets a preset first screening condition are determined, where the prop usage videos can be pre-recorded introduction videos for the props, or can be effect videos after other users use the props to render the shooting content.

The usage popularity of the prop usage videos related to the props can be screened, and the prop usage videos which usage popularity is greater than the preset value are considered to be the plurality of prop usage videos that meet the preset first screening condition, etc.

After the prop usage videos which usage popularity is greater than a certain value are first screened, a target usage user identifier that matches friend identifiers in the address book of the user identifier of the client that initiates the prop recommendation request can also be determined from among usage user identifiers in the prop usage videos, and the prop usage videos corresponding to the target usage user identifier are taken as the plurality of prop usage videos meeting the preset first screening condition, etc.

After the prop usage videos which usage popularity is greater than a certain value are screened, a shooting time of the prop usage videos can also be acquired, and prop usage candidate videos that match a preset time are acquired based on the shooting time, where the duration of the preset time can be three months, a week, a day, etc., and the matching of the preset time is used to ensure that the usage videos corresponding to the prop popularity ranking list are the recently popular usage videos; then, keywords in the candidate videos are extracted, for example, subtitle keywords in the candidate videos are extracted, and for example, content recognition is performed on video frames of the candidate videos to generate content recognition results, and keywords in the content recognition results are extracted; the keywords are matched with preset target keywords for screening; and the successfully screened candidate videos are determined as the plurality of prop usage videos which video popularity meets the preset first screening condition.

In one embodiment of the present disclosure, if the preset target keywords include blacklist keywords, determining the successfully screened candidate videos as the plurality of prop usage videos which video popularity meets the preset first screening condition includes: screening out candidate videos that contain the preset target keywords, and determining the remaining candidate videos as the plurality of prop usage videos which video popularity meets the preset first screening condition; or, if the preset target keywords include whitelist keywords, determining the successfully screened candidate videos as the plurality of prop usage videos which video popularity meets the preset first screening condition includes: determining the screened candidate videos that contain the preset target keywords as the plurality of prop usage videos which video popularity meets the preset first screening condition.

In some embodiments, the above preset target keywords may be blacklist keywords that contain illegal keywords, thus screening out candidate videos that contain the preset target keywords, and determining the remaining candidate videos as the plurality of prop usage videos which video popularity meets the preset first screening condition. In other embodiments, the above preset target keywords may be whitelist keywords that contain legal keywords, thus screening candidate videos that contain the preset target keywords as the plurality of prop usage videos which video popularity meets the preset first screening condition.

Step 1003, send the plurality of prop usage videos to the client, and display the recommended video set for use of prop.

In this embodiment, the plurality of prop usage videos are sent to the client, and the recommended video set for use of prop is displayed, so that based on the usage of the client, the user can intuitively learn the rendering effect of each prop according to the prop usage videos displayed in the recommended video set, which facilitates the improved efficiency of selecting props, etc.

In one embodiment of the present disclosure, if the client selects a certain prop usage video in the corresponding recommended video set, for example, the shooting control in the certain prop usage video is triggered, the video identifier of the certain prop usage video is acquired, such as a video ID, a video number, etc. A shooting request carrying the video identifier that is sent by the client is received; further, a prop identifier corresponding to the video identifier is acquired, and a resource package corresponding to the prop identifier is sent to the client, so that the client acquires a target prop configuration template according to the resource package to render the shot video content. The mode of rendering the shot video content according to the target prop configuration template may refer to the above embodiment and will not be described again here.

In summary, according to the prop processing method provided in the embodiment of the present disclosure, a prop recommendation request sent by a client is received; further, a plurality of prop usage videos which video popularity meets a preset first screening condition are determined, the plurality of prop usage videos are sent to the client, and the recommended video set for use of prop is displayed. In this way, the server recommends the recommended video set to the client based on the video popularity, which realizes the recommendation of props based on the usage popularity of props on the entire network; and props are intuitively recommended based on the form of recommended videos, which improves the efficiency of selecting props and improves the fun of using props.

In order to further enrich the prop recommendation modes, props can also be recommended to the client based on popularity in the form of a list in the present disclosure. In this way, props that are more popular among other users on the entire network are recommended to the client.

Figure 11:
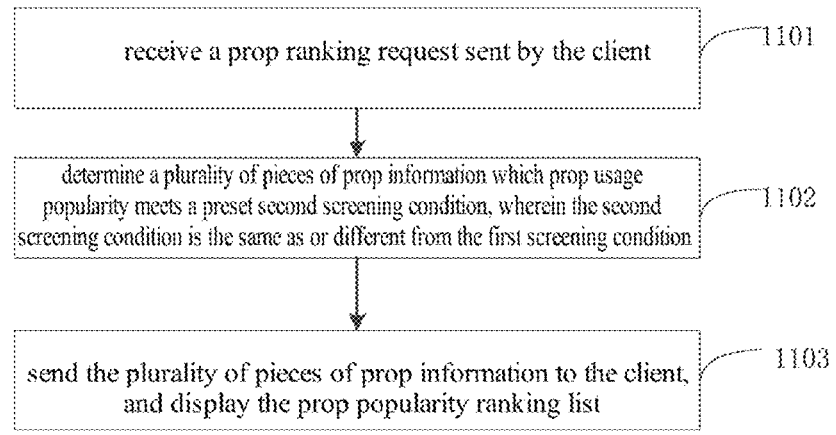
FIG. 11 is a schematic flowchart of another prop processing method provided in an embodiment of the present disclosure.

In one embodiment of the present disclosure, as shown in FIG. 11, the method further includes:

Step 1101, receive a prop ranking request sent by the client.

In one embodiment of the present disclosure, if it is detected that the user of the client triggers the prop ranking identifier displayed on the prop exploration page, the prop ranking request sent by the client is acquired.

Step 1102, determine a plurality of pieces of prop information which prop usage popularity meets a preset second screening condition, where the second screening condition is the same as or different from the first screening condition.

In this embodiment, the usage popularity of props on the entire network is acquired, such as the total number of times the props are used, and further, a plurality of pieces of prop information which prop usage popularity meets the preset second screening condition is determined, where the prop information includes one or more of prop usage videos, prop names, prop usage times, prop icons, etc.

The preset second screening condition may be the same as or different from the first screening condition.

The usage popularity of the props can be screened, and the prop information of the props which usage popularity is greater than the preset value is considered to be the plurality of pieces of prop information that meet the second screening condition, etc.

After the prop usage videos with usage popularity are first screened, a target usage user identifier that matches friend identifiers in the address book of the user identifier of the client that initiates the prop recommendation request can also be determined from among usage user identifiers of the props, and the prop information of the props corresponding to the target usage user identifier is taken as the plurality of pieces of prop information that meet the second screening condition, etc.

Step 1103, send the plurality of pieces of prop information to the client, and display the prop popularity ranking list.

In this embodiment, the plurality of pieces of prop information are sent to the client, and the prop popularity ranking list is displayed. In this way, props are recommended based on the dimensions of the ranking list, so that the props recommended to the client are no longer only match the user's personal portrait information, but also still relatively popular on the entire network, thereby enriching the recommended props.

In one embodiment of the present disclosure, a shooting control, etc. are correspondingly provided for each piece of prop information in the prop popularity ranking list. Then, in response to the client's trigger operation on the shooting control of the target prop in the prop popularity ranking list, the prop identifier of the target prop is acquired, and a shooting request carrying the prop identifier that is sent by the client is received; further, a resource package corresponding to the prop identifier is sent to the client, so that the client acquires a target prop configuration template according to the resource package to render the shot video content.

Acquiring a target prop configuration template according to a resource package to render the shot video content may refer to the above embodiment and will not be described again here.

In summary, according to the prop processing method provided in the embodiment of the present disclosure, the server can also recommend props to the client based on the prop popularity ranking list. Props are recommended based on the popularity of the props used by all users, which improves the success rate of recommendations on the basis of the enrichment of the recommended props.

Figure 12:
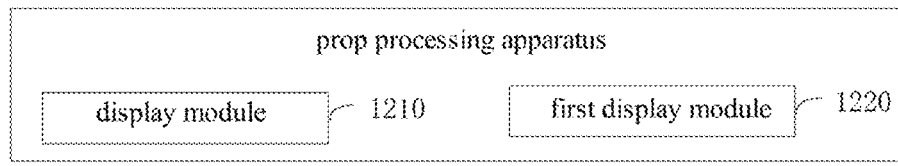
FIG. 12 is a schematic structural diagram of a prop processing apparatus provided in an embodiment of the present disclosure.

FIG. 12 is a schematic structural diagram of a prop processing apparatus provided in an embodiment of the present disclosure. The apparatus can be implemented by software and/or hardware, and can generally be integrated in an electronic device corresponding to the client. As shown in FIG. 12, the apparatus includes a display module 1210 and a first display module 1220, where the display module 1210 is configured to display, in response to a trigger operation on a prop exploration entry identifier set on a prop panel, a prop exploration page that includes a prop recommendation identifier; and the first display module 1220 is configured to display, in response to a trigger operation on the prop recommendation identifier, a recommended video set for use of prop.

The prop processing apparatus provided in the embodiment of the present disclosure can execute the prop processing method provided in the embodiment of the disclosure focused on the client side, and has corresponding functional modules and beneficial effects for executing the method.

Figure 13:
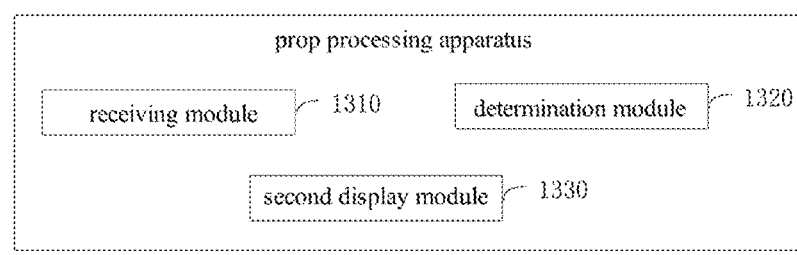
FIG. 13 is a schematic structural diagram of another prop processing apparatus provided in an embodiment of the present disclosure.

FIG. 13 is a schematic structural diagram of a prop processing apparatus provided in an embodiment of the present disclosure. The apparatus can be implemented by software and/or hardware, and can generally be integrated in an electronic device corresponding to the server. As shown in FIG. 13, the apparatus includes: a receiving module 1310, a determining module 1320, and a second display module 1330, where the receiving module 1310 is configured to receive a prop recommendation request sent by a client;

the determination module 1320 is configured to determine a plurality of prop usage videos which video popularity meets a preset first screening condition; and the second display module 1330 is configured to send the plurality of prop usage videos to the client, and display the recommended video set for use of prop.

The prop processing apparatus provided in the embodiment of the present disclosure can execute the prop processing method provided in the embodiment of the disclosure focused on the server side, and has corresponding functional modules and beneficial effects for executing the method.

In order to implement the above embodiments, the present disclosure also provides a computer program product including a computer program/instructions. When the computer program/instructions is/are executed by a processor, the prop processing method in the above embodiments is implemented.

Figure 14:
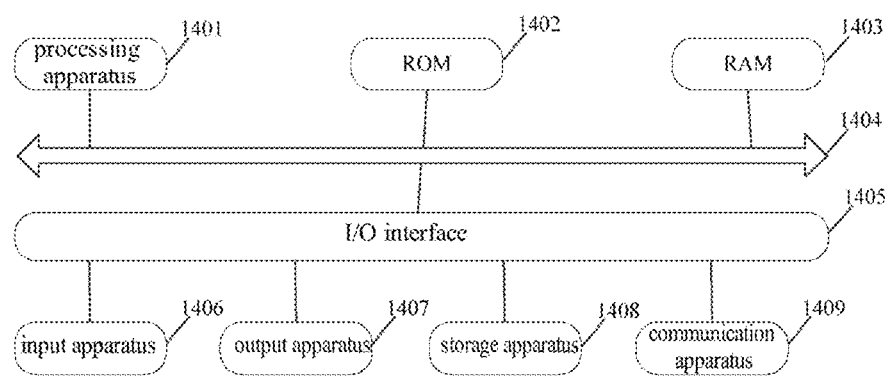
FIG. 14 is a schematic structural diagram of an electronic device provided in an embodiment of the present disclosure.

FIG. 14 is a schematic structural diagram of an electronic device provided in an embodiment of the present disclosure.

Referring specifically to FIG. 14 below, a schematic structural diagram suitable for implementing the electronic device 1400 in the embodiment of the present disclosure is shown. The electronic device 1400 in the embodiment of the present disclosure may include, but is not limited to, mobile terminals such as a mobile phone, a laptop, a digital broadcast receiver, a personal digital assistant (PDA), a portable Android device (PAD), a portable media player (PMP), and a vehicle-mounted terminals (such as a vehicle-mounted navigation terminals), as well as fixed terminals such as a digital TV and a desktop computer. The electronic device shown in FIG. 4 is only an example and should not impose any limitations on the functions and scope of use of the embodiment of the present disclosure.

As shown in FIG. 14, the electronic device 1400 may include a processing apparatus 1401 (e.g., a central processing unit, and a graphics processor), which may execute various appropriate actions and processes according to programs stored in a read-only memory (ROM) 1402 or programs loaded from a storage apparatus 1408 into a random access memory (RAM) 1403. In the RAM 1403, various programs and data required for the operation of the electronic device 1400 are also stored. The processing apparatus 1401, ROM 1402 and RAM 1403 are connected to each other via a bus 1404. An input/output (I/O) interface 1405 is also connected to the bus 1404.

Generally, the following apparatuses may be connected to the I/O interface 1405: an input apparatus 1406 including, for example, a touch screen, a touch pad, a keyboard, a mouse, a camera, a microphone, an accelerometer, and a gyroscope; an output apparatus 1407 including, for example, a liquid crystal display (LCD), a speaker, and a vibrator; the storage apparatus 1408 including, for example, a magnetic tape, and a hard disk; and a communication apparatus 1409. The communication apparatus 1409 may allow the electronic device 1400 to communicate with other devices in a wireless or wired manner, so as to exchange data. Although FIG. 14 illustrates the electronic device 1400 with various apparatuses, it should be understood that it is not required to implement or provide all of the illustrated apparatuses. More or fewer apparatuses may alternatively be implemented or provided.

In particular, according to the embodiments of the present disclosure, the processes described above with reference to the flowcharts may be implemented as computer software programs. For example, an embodiment of the present disclosure includes a computer program product including a computer program carried on a non-transitory computer-readable medium, the computer program containing program codes for performing the method illustrated in the flowcharts. In such embodiment, the computer program may be downloaded and installed from the network through the communication apparatus 1409, or installed from the storage apparatus 1408, or installed from the ROM 1402. When the computer program is executed by the processing apparatus 1401, the above functions defined in the prop processing method provided in the embodiment of the present disclosure are performed.

It should be noted that the computer-readable medium mentioned above in the present disclosure may be a computer-readable signal medium or a computer-readable storage medium, or any combination of the above two. The computer-readable storage medium may be, for example, but is not limited to, an electrical, magnetic, optical, electromagnetic, infrared, or semiconductor system, apparatus or device, or any combination thereof. More specific examples of computer-readable storage media may include, but are not limited to: an electrical connection having one or more wires, a portable computer disk, a hard drive, a random access memory (RAM), a read-only memory (ROM), an erasable programmable read-only memory (EPROM or a flash memory), fiber optics, a portable compact disk read-only memory (CD-ROM), an optical storage device, a magnetic storage device, or any suitable combination of the above. In the present disclosure, the computer-readable storage medium may be any tangible medium that contains or stores a program for use by or in connection with an instruction execution system, apparatus, or device. While in the present disclosure, the computer-readable signal medium may include a data signal propagated in a baseband or as part of a carrier wave, carrying computer-readable program codes therein. Such propagated data signals may take many forms, including but not limited to electromagnetic signals, optical signals, or any suitable combination of the above. The computer-readable signal medium may also be any computer-readable medium other than the computer-readable storage medium that can send, propagate, or transmit a program for use by or in connection with the instruction execution system, apparatus, or device. The program codes embodied on the computer-readable medium may be transmitted using any suitable medium, including but not limited to: a wire, an optical cable, a RF (radio frequency), etc., or any suitable combination of the above.

In some implementations, the client and server can communicate using any currently known or future developed network protocol such as a hypertext transfer protocol (HTTP), and can be interconnected to digital data communications (e.g., communications networks) in any form or medium. Examples of communication networks include a local area network ("LAN"), a wide area network ("WAN"), an inter-network (e.g., the Internet), and an end-to-end network (e.g., an ad hoc end-to-end network), as well as any currently known or future developed networks.

The above computer-readable medium may be contained in the above electronic device, and may also exist independently without being assembled into the electronic device.

The above computer-readable medium carries one or more programs which, when executed by the electronic device, causes the electronic device to: in response to a trigger operation on a prop exploration entry identifier, display a prop exploration page that includes a prop recommendation identifier, and further, in response to a trigger operation on the prop recommendation identifier, display a recommended video set for use of prop, so that the recommended props are enriched, and props are intuitively recommended based on the form of recommended videos, which improves the efficiency of selecting props and improves the fun of using props; or to: receive a prop recommendation request sent by a client, further determine a plurality of prop usage videos which video popularity meets a preset first screening condition, send the plurality of prop usage videos to the client, and display a recommended video set for use of prop, so that the server recommends the recommended video set to the client based on the video popularity, which realizes the recommendation of props based on the usage popularity of props on the entire network; and props are intuitively recommended based on the form of recommended videos, which improves the efficiency of selecting props and improves the fun of using props.

Computer program codes for performing operations of the present disclosure may be written in one or more programming languages or a combination thereof. The above programming languages include, but are not limited to, object-oriented programming languages such as Java, Smalltalk and C++, and include conventional procedural programming languages such as "C" or similar programming languages. The program codes may be executed entirely on the user's computer, partly on the user's computer, as a stand-alone software package, partly on the user's computer and partly on a remote computer, or entirely on the remote computer or a server. In situations involving a remote computer, the remote computer can be connected to the user's computer through any kind of networks, including a local area network (LAN) or a wide area network (WAN), or can be connected to an external computer (e.g., using an Internet service provider for connection through the Internet).

The flowcharts and block diagrams in the accompanying drawings illustrate the architecture, functionality, and operations of possible implementations of the system, methods, and computer program product according to various embodiments of the present disclosure. In this regard, each block in the flowcharts or block diagrams may represent a module, a segment, or part of codes that contains one or more executable instructions used to implement specified logic functions. It should also be noted that, in some alternative implementations, the functions noted in the blocks may occur out of the order noted in the accompanying drawings. For example, two blocks shown one after another may actually execute substantially in parallel, or may sometimes execute in the reverse order, depending on the functionality involved. It will also be noted that each block in the block diagrams and/or flowcharts, and combinations of the blocks in the block diagrams and/or flowcharts can be implemented with specialized hardware-based systems that perform the specified functions or operations, or can be implemented with a combination of specialized hardware and computer instructions.

The units involved in the embodiments of the present disclosure can be implemented in software or hardware. Names of the units do not constitute a limitation on the units themselves under certain circumstances.

The functions described above herein may be performed, at least in part, by one or more hardware logic components. For example and without limitation, exemplary types of hardware logic components that may be used include: a field programmable gate array (FPGA), an application specific integrated circuit (ASIC), an application specific standard product (ASSP), a system on chip (SOC), a complex programmable logical device (CPLD), etc.

In the context of the present disclosure, a machine-readable medium may be a tangible medium that may contain or store a program for use by or in connection with an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, apparatuses or devices, or any suitable combination of the above. More specific examples of the machine-readable storage medium would include one or more wire-based electrical connections, a laptop disk, a hard drive, a random access memory (RAM), a read-only memory (ROM), an erasable programmable read-only memory (EPROM or a flash memory), fiber optics, a portable compact disk read-only memory (CD-ROM), an optical storage device, a magnetic storage device, or any suitable combination of the above.

According to one or more embodiments of the present disclosure, the present disclosure provides a prop processing method, including: in response to a trigger operation on a prop exploration entry identifier set on a prop panel, displaying a prop exploration page that includes a prop recommendation identifier; and in response to a trigger operation on the prop recommendation identifier, displaying a recommended video set for use of prop.

According to one or more embodiments of the present disclosure, in the prop processing method provided in the present disclosure, each video in the recommended video set is provided with a shooting control, and the method further includes:

in response to a trigger operation on the shooting control of a first video in the recommended video set, switching to a shooting page; and acquiring a resource package of a target prop used in the first video, parsing the resource package to acquire a target prop configuration template, and rendering shooting content according to the target prop configuration template to generate a second video.

According to one or more embodiments of the present disclosure, in the prop processing method provided in the present disclosure, the prop exploration page further includes a prop list identifier, and the method further includes:

in response to a trigger operation on the prop list identifier, displaying a prop popularity ranking list.

According to one or more embodiments of the present disclosure, in the prop processing method provided in the present disclosure, in response to a switching operation on the prop list identifier or the prop recommendation identifier, the prop popularity ranking list or the recommended video set for use of prop is displayed in a preset target area; or, in response to a trigger operation on the prop list identifier and the prop recommendation identifier, the prop popularity ranking list is displayed in a preset first area, and the recommended video set for use of prop is displayed in a preset second area, where the second area is different from the first area.

According to one or more embodiments of the present disclosure, in the prop processing method provided in the present disclosure, if in response to the trigger operation on the prop list identifier and the prop recommendation identifier, the prop popularity ranking list is displayed in the preset first area, and the recommended video set for use of prop is displayed in the preset second area, the method further includes:

in response to a trigger operation on the first area, updating the prop popularity ranking list that is displayed in the first area; or, in response to a trigger operation on the second area, updating the recommended video set for use of prop that is displayed in the second area.

According to one or more embodiments of the present disclosure, in the prop processing method provided in the present disclosure, a shooting control is correspondingly provided for each piece of prop information in the prop popularity ranking list, and the method further includes:

in response to a trigger operation on the shooting control of a target prop in the prop popularity ranking list, switching to the shooting page; and acquiring a resource package corresponding to the target prop, parsing the resource package to acquire a target prop configuration template, and rendering the shooting content according to the target prop configuration template to generate a target video.

According to one or more embodiments of the present disclosure, a video demonstration control is correspondingly provided for each piece of prop information in the prop popularity ranking list, and the method further includes:

in response to a trigger operation on the video demonstration control of a target prop in the prop popularity ranking list, displaying a demonstration video using the target prop.

According to one or more embodiments of the present disclosure, the present disclosure provides a prop processing method, including: receiving a prop recommendation request sent by a client;

determining a plurality of prop usage videos which video popularity meets a preset first screening condition; and sending the plurality of prop usage videos to the client, and displaying a recommended video set for use of prop.

According to one or more embodiments of the present disclosure, the prop processing method provided in the present disclosure further includes:

receiving a shooting request carrying a video identifier that is sent by the client; and acquiring a prop identifier corresponding to the video identifier, and sending a resource package corresponding to the prop identifier to the client, so that the client acquires a target prop configuration template according to the resource package to render a shot video content.

According to one or more embodiments of the present disclosure, in the prop processing method provided in the present disclosure, determining a plurality of prop usage videos which video popularity meets a preset first screening condition includes:

acquiring prop usage candidate videos that match a preset time; and extracting keywords in the candidate videos, matching the keywords with preset target keywords for screening, and determining successfully screened candidate videos as the plurality of prop usage videos which video popularity meets the preset first screening condition.

According to one or more embodiments of the present disclosure, in the prop processing method provided in the present disclosure, if the preset target keywords include blacklist keywords, determining successfully screened candidate videos as the plurality of prop usage videos which video popularity meets the preset first screening condition includes:

screening out candidate videos that contain the preset target keywords, and determining the remaining candidate videos as the plurality of prop usage videos which video popularity meets the preset first screening condition; or, if the preset target keywords include whitelist keywords, determining successfully screened candidate videos as the plurality of prop usage videos which video popularity meets the preset first screening condition includes:

determining the screened candidate videos that contain the preset target keywords as the plurality of prop usage videos which video popularity meets the preset first screening condition.

According to one or more embodiments of the present disclosure, the prop processing method provided in the present disclosure further includes:

receiving a prop ranking request sent by the client;

determining a plurality of pieces of prop information which prop usage popularity meets a preset second screening condition, where the second screening condition is the same as or different from the first screening condition; and sending the plurality of pieces of prop information to the client, and displaying a prop popularity ranking list.

According to one or more embodiments of the present disclosure, the present disclosure provides a prop processing apparatus, including:

a display module, which is configured to display, in response to a trigger operation on a prop exploration entry identifier set on a prop panel, a prop exploration page that includes a prop recommendation identifier; and a first display module, which is configured to display, in response to a trigger operation on the prop recommendation identifier, a recommended video set for use of prop.

According to one or more embodiments of the present disclosure, in the prop processing apparatus provided in the present disclosure, a shooting control is provided for each video in the recommended video set, and the apparatus further includes:

a switching module, which is configured to switch to a shooting page in response to a trigger operation on the shooting control of a first video in the recommended video set; and a generation module, which is configured to acquire a resource package of a target prop used in the first video, parse the resource package to acquire a target prop configuration template, and render shooting content according to the target prop configuration template to generate a second video.

According to one or more embodiments of the present disclosure, in the prop processing apparatus provided in the present disclosure, the prop exploration page further includes a prop list identifier, and the apparatus further includes:

a display module, which is configured to display a prop popularity ranking list in response to a trigger operation on the prop list identifier.

According to one or more embodiments of the present disclosure, in the prop processing apparatus provided in the present disclosure, the display module is specifically configured to:

in response to a switching operation on the prop list identifier or the prop recommendation identifier, display the prop popularity ranking list or the recommended video set for use of prop in a preset target area; or, in response to a trigger operation on the prop list identifier and the prop recommendation identifier, display the prop popularity ranking list in a preset first area, and display the recommended video set for use of prop in a preset second area, where the second area is different from the first area.

According to one or more embodiments of the present disclosure, in the prop processing apparatus provided in the present disclosure, the display module is specifically configured to:

in response to a trigger operation on the first area, update the prop popularity ranking list that is displayed in the first area;

or, in response to a trigger operation on the second area, update the recommended video set for use of prop that is displayed in the second area.

According to one or more embodiments of the present disclosure, in the prop processing apparatus provided in the present disclosure, a shooting control is correspondingly provided for each piece of prop information in the prop popularity ranking list, and the display module is specifically configured to:

in response to a trigger operation on the shooting control of a target prop in the prop popularity ranking list, switch to the shooting page; and acquire a resource package corresponding to the target prop, parse the resource package to acquire a target prop configuration template, and render the shooting content according to the target prop configuration template to generate a target video.

According to one or more embodiments of the present disclosure, in the prop processing apparatus provided in the present disclosure, a video demonstration control is correspondingly provided for each piece of prop information in the prop popularity ranking list, and the display module is specifically configured to:

in response to a trigger operation on the video demonstration control of a target prop in the prop popularity ranking list, display a demonstration video using the target prop.

According to one or more embodiments of the present disclosure, the present disclosure provides a prop processing apparatus, including: a receiving module, which is configured to receive a prop recommendation request sent by a client;

a determination module, which is configured to determine a plurality of prop usage videos which video popularity meets a preset first screening condition; and a second display module, which is configured to send the plurality of prop usage videos to the client, and display a recommended video set for use of prop.

According to one or more embodiments of the present disclosure, in the prop processing apparatus provided in the present disclosure, the determination module is specifically configured to:

acquire prop usage candidate videos that match a preset time; and extract keywords in the candidate videos, match the keywords with preset target keywords for screening, and determine successfully screened candidate videos as the plurality of prop usage videos which video popularity meets the preset first screening condition.

According to one or more embodiments of the present disclosure, in the prop processing apparatus provided in the present disclosure, if the preset target keywords include blacklist keywords, the determination module is specifically configured to:

screen out candidate videos that contain the preset target keywords, and determine the remaining candidate videos as the plurality of prop usage videos which video popularity meets the preset first screening condition; or, if the preset target keywords include whitelist keywords, the determination module is specifically configured to:

determine the screened candidate videos that contain the preset target keywords as the plurality of prop usage videos which video popularity meets the preset first screening condition.

According to one or more embodiments of the present disclosure, the prop processing apparatus provided in the present disclosure further includes:

a first request receiving module, which is configured to receive a shooting request carrying a video identifier that is sent by the client; and a first sending module, which is configured to acquire a prop identifier corresponding to the video identifier, and send a resource package corresponding to the prop identifier to the client, so that the client acquires a target prop configuration template according to the resource package to render a shot video content.

According to one or more embodiments of the present disclosure, the prop processing apparatus provided in the present disclosure further includes:

a receiving module, which is configured to receive a prop ranking request sent by the client;

the determination module, which is further configured to determine a plurality of pieces of prop information which prop usage popularity meets a preset second screening condition, where the second screening condition is the same as or different from the first screening condition; and a second sending module, which is configured to send the plurality of pieces of prop information to the client, and display the prop popularity ranking list.

According to one or more embodiments of the present disclosure, the prop processing apparatus provided in the present disclosure further includes:

a second request receiving module, which is configured to receive a prop ranking request sent by the client;

a prop information determination module, which is configured to determine a plurality of pieces of prop information which prop usage popularity meets a preset second screening condition, where the second screening condition is the same as or different from the first screening condition; and a ranking list display module, which is configured to send the plurality of pieces of prop information to the client, and display the prop popularity ranking list.

According to one or more embodiments of the present disclosure, the present disclosure provides an electronic device, including:

a processor; and a memory for storing instructions executable by the processor;

the processor is configured to read the executable instructions from the memory, and execute the instructions to implement any of the prop processing methods provided in the present disclosure.

According to one or more embodiments of the present disclosure, the present disclosure provides a computer-readable storage medium storing a computer program, which is used to execute any of the prop processing methods provided in the present disclosure.

The above description is only a description of the preferred embodiments of the present disclosure and the technical principles applied. Those skilled in the art should understand that the disclosure scope involved in the present disclosure is not limited to technical solutions formed by specific combinations of the above technical features, but should also cover other technical solutions formed by any combination of the above technical features or their equivalent features without departing from the above disclosed concept, for example, a technical solution formed by interchanging the above features with technical features having similar functions disclosed (but not limited to) in the present disclosure.

Furthermore, although various operations are depicted in a specific order, this should not be understood as requiring that these operations be performed in the specific order shown or performed in a sequential order. Under certain circumstances, multitasking and parallel processing may be advantageous. Likewise, although several specific implementation details are included in the above discussion, these details should not be construed as limiting the scope of the present disclosure. Certain features that are described in the context of separate embodiments can also be implemented in combination in a single embodiment. Conversely, various features that are described in the context of a single embodiment can also be implemented in a plurality of embodiments separately or in any suitable sub-combination.

Although the subject matter has been described in language specific to structural features and/or methodological actions, it should be understood that the subject matter defined in the appended claims is not necessarily limited to the specific features or actions described above. Rather, the specific features and actions described above are merely example forms of implementing the claims.

What is claimed is:

1. A prop processing method, comprising the following steps:

in response to a trigger operation on a prop exploration entry identifier set on a prop panel, displaying a prop exploration page, wherein the prop exploration page comprises a prop recommendation identifier; and in response to a trigger operation on the prop recommendation identifier, displaying a recommended set of prop usage videos, the prop usage video comprising at least one of pre-recorded introduction videos for the props or effect videos obtained after other users use the props to render the shooting content, wherein each video in the recommended set of prop usage videos is provided with a shooting control, and the method further comprises:

in response to a trigger operation on the shooting control of a first video in the recommended set of prop usage videos, switching to a shooting page; and acquiring a resource package of a target prop used in the first video, parsing the resource package to acquire a target prop configuration template of the first video, and rendering shooting content according to the target prop configuration template of the first video to generate a second video, wherein the target prop configuration template of the first video comprises configuration for the target prop when rendering the first video.

2. The method according to claim 1, wherein the prop exploration page further comprises a prop list identifier, and the method further comprises:

in response to a trigger operation on the prop list identifier, displaying a prop popularity ranking list.

3. The method according to claim 2, wherein in response to a switching operation on the prop list identifier or the prop recommendation identifier, the prop popularity ranking list or the recommended set of prop usage videos is displayed in a preset target area;

or, in response to a trigger operation on the prop list identifier and the prop recommendation identifier, the prop popularity ranking list is displayed in a preset first area, and the recommended set of prop usage videos is displayed in a preset second area, wherein the second area is different from the first area.

4. The method according to claim 3, wherein if in response to the trigger operation on the prop list identifier and the prop recommendation identifier, the prop popularity ranking list is displayed in the preset first area, and the recommended set of prop usage videos is displayed in the preset second area, the method further comprises at least one of the following steps:

in response to a trigger operation on the first area, updating the prop popularity ranking list that is displayed in the first area;

or, in response to a trigger operation on the second area, updating the recommended set of prop usage videos that is displayed in the second area.

5. The method according to claim 2, wherein a shooting control is correspondingly provided for each piece of prop information in the prop popularity ranking list, and the method further comprises:

in response to a trigger operation on the shooting control of a target prop in the prop popularity ranking list, switching to the shooting page; and acquiring a resource package corresponding to the target prop, parsing the resource package to acquire a target prop configuration template, and rendering the shooting content according to the target prop configuration template to generate a target video.

6. The method according to claim 2, wherein a video demonstration control is correspondingly provided for each piece of prop information in the prop popularity ranking list, and the method further comprises:

in response to a trigger operation on the video demonstration control of a target prop in the prop popularity ranking list, displaying a demonstration video using the target prop.

7. A non-transitory computer-readable storage medium, wherein the storage medium stores a computer program, and the computer program is used to execute the prop processing method according to claim 1.

8. An electronic device, wherein the electronic device comprises:
    a processor; and
    a memory for storing instructions executable by the processor;

the processor is configured to read the executable instructions from the memory, and execute the executable instructions to implement the following steps:

in response to a trigger operation on a prop exploration entry identifier set on a prop panel, displaying a prop exploration page, wherein the prop exploration page comprises a prop recommendation identifier; and in response to a trigger operation on the prop recommendation identifier, displaying a recommended set of prop usage videos, the prop usage video comprising at least one of pre-recorded introduction videos for the props or effect videos obtained after other users use the props to render the shooting content, wherein each video in the recommended set of prop usage videos is provided with a shooting control, and the processor is further configured to execute the executable instructions to implement the following steps:

in response to a trigger operation on the shooting control of a first video in the recommended set of prop usage videos, switching to a shooting page; and acquiring a resource package of a target prop used in the first video, parsing the resource package to acquire a target prop configuration template of the first video, and rendering shooting content according to the target prop configuration template of the first video to generate a second video, wherein the target prop configuration template of the first video comprises configuration for the target prop when rendering the first video.

* * * * *